(12) United States Patent
Neevin et al.

(10) Patent No.: US 10,563,929 B2
(45) Date of Patent: Feb. 18, 2020

(54) HEAT EXCHANGER TUBE SPACING DEVICE (VARINATS)

(71) Applicant: JOINT STOCK COMPANY "AKME-ENGINEERING", Moscow (RU)

(72) Inventors: Viktor Semenovich Neevin, Podolsk (RU); Mihail Petrovich Vakhrushin, Podolskiy rayon (RU)

(73) Assignee: JOINT STOCK COMPANY "AKME-ENGINEERING" (RU)

( * ) Notice: Subject to any disclaimer, the term of this patent is extended or adjusted under 35 U.S.C. 154(b) by 123 days.

(21) Appl. No.: 15/540,818

(22) PCT Filed: Dec. 1, 2015

(86) PCT No.: PCT/RU2015/000837
§ 371 (c)(1),
(2) Date: Jun. 29, 2017

(87) PCT Pub. No.: WO2016/108729
PCT Pub. Date: Jul. 7, 2016

(65) Prior Publication Data
US 2017/0321971 A1    Nov. 9, 2017

(30) Foreign Application Priority Data

Dec. 30, 2014 (RU) .................... 2014153832

(51) Int. Cl.
*F28F 9/013* (2006.01)
*F28F 9/02* (2006.01)
(Continued)

(52) U.S. Cl.
CPC .............. *F28F 9/0131* (2013.01); *F28D 7/16* (2013.01); *F28F 9/013* (2013.01); *F28F 9/0135* (2013.01);
(Continued)

(58) Field of Classification Search
CPC ........ F28F 9/013; F28F 9/0131; F28F 9/0135; F28F 9/0136; F28F 9/0243;
(Continued)

(56) References Cited

U.S. PATENT DOCUMENTS 3,104,218 A * 9/1963 Speidel .................... G21C 1/20
376/442
3,490,521 A * 1/1970 Byerley ................ F28D 7/1669
165/158

(Continued)

FOREIGN PATENT DOCUMENTS

CN    201170703 Y  * 12/2008
CN    201964823 U    9/2011
(Continued)

OTHER PUBLICATIONS

DE 1085976 B English Machine Translation (Year: 1960).*
Effectively Design Shell-and-Tube Heat Exchangers—Mukherjee (1998) (Year: 1998).*

*Primary Examiner* — Cassey D Bauer
*Assistant Examiner* — Jenna M Hopkins
(74) *Attorney, Agent, or Firm* — Colin P. Cahoon; Shaukat A. Karjeker; Carstens & Cahoon, LLP

(57) ABSTRACT

Heat exchangers for use in heavy liquid metal coolant mediums that ensure reliable fixation and spacing of heat exchanger tubes. A first embodiment includes one supporting spacer grid having a cylindrical shell and two or more tiers of plates spaced apart at a preset gap, while the width of each plate is parallel to the shell axis. Ends of all plates are fixed to the shell such that plates of any tier are parallel to each other and located at the preset gap. Plates of different tiers are criss-crossed at an angle of 60 degrees along the shell axles and fastened together at the crossing points. Another embodiment includes three dividers which run (Continued)

through the cylinder axis; their ends are connected to the shell and are spaced at an angle of 60 degrees.

10 Claims, 3 Drawing Sheets

(51) Int. Cl.
| | |
|---|---|
| *F28F 9/22* | (2006.01) |
| *F28D 7/16* | (2006.01) |
| *G21C 3/32* | (2006.01) |
| *G21C 3/34* | (2006.01) |
| *F16L 3/23* | (2006.01) |
| *F16L 3/22* | (2006.01) |
| *G21C 3/352* | (2006.01) |

(52) U.S. Cl.
CPC .......... *F28F 9/0136* (2013.01); *F28F 9/0243* (2013.01); *F16L 3/22* (2013.01); *F16L 3/23* (2013.01); *F28F 2009/222* (2013.01); *F28F 2009/226* (2013.01); *F28F 2225/00* (2013.01); *F28F 2225/04* (2013.01); *F28F 2240/00* (2013.01); *G21C 3/32* (2013.01); *G21C 3/34* (2013.01); *G21C 3/352* (2013.01)

(58) Field of Classification Search
CPC ............. F28F 2225/00; F28F 2225/04; F28F 2009/222; F28F 2009/226; F28D 7/16; G21C 3/352; G21C 3/34; G21C 3/32; F16L 3/22; F16L 3/23
USPC .................................. 165/178, 162
See application file for complete search history.

(56) References Cited

U.S. PATENT DOCUMENTS

| | | | | | |
|---|---|---|---|---|---|
| 3,545,537 | A | * | 12/1970 | Hill, Jr. ................ | F22B 37/206 122/510 |
| 3,820,594 | A | * | 6/1974 | Ritland ................ | F28F 9/0136 165/162 |
| 3,996,102 | A | * | 12/1976 | Thorne .................... | G21C 5/06 376/462 |
| 4,036,461 | A | * | 7/1977 | Soligno ................. | F28F 9/0136 165/162 |
| 4,210,202 | A | * | 7/1980 | Boyer .................. | F28F 9/0135 165/162 |
| 4,359,088 | A | * | 11/1982 | Jabsen ................. | F28F 9/0136 122/510 |
| 4,579,304 | A | * | 4/1986 | Williams ............. | F28F 9/0136 165/172 |
| 4,637,455 | A | * | 1/1987 | Tordonato ............. | F28F 9/0132 122/510 |
| 5,291,944 | A | * | 3/1994 | Sanz .................... | F28D 7/1669 165/157 |
| 5,570,739 | A | * | 11/1996 | Krawchuk ............ | F28F 9/0132 165/162 |
| 5,642,778 | A | * | 7/1997 | Gentry ................. | F28F 9/0132 165/162 |
| 5,813,451 | A | * | 9/1998 | Chawla ................. | B01D 45/16 165/109.1 |
| 7,464,671 | B2 | * | 12/2008 | Harth, III ............. | F22B 37/202 122/510 |
| 7,997,329 | B2 | * | 8/2011 | Mulder ................... | B01J 8/008 165/161 |
| 9,302,205 | B1 | * | 4/2016 | Nehlen, III .......... | F28F 9/0221 |
| 9,500,415 | B2 | * | 11/2016 | Chang ...................... | F28D 7/16 |
| 9,677,825 | B2 | * | 6/2017 | Artamo ................... | F28D 7/16 |
| 2005/0161204 | A1 | * | 7/2005 | Johnston ................ | F28D 7/16 165/162 |
| 2005/0167089 | A1 | * | 8/2005 | Ozeki ...................... | F28D 7/16 165/162 |
| 2008/0104838 | A1 | * | 5/2008 | Sun ....................... | F22B 37/205 29/890.03 |
| 2009/0200004 | A1 | * | 8/2009 | Johnston ................. | F28D 7/16 165/172 |
| 2010/0116478 | A1 | * | 5/2010 | Wanni ..................... | F28D 7/16 165/162 |
| 2010/0282451 | A1 | * | 11/2010 | Singh ....................... | F01K 7/06 165/162 |
| 2011/0051882 | A1 | * | 3/2011 | Yoon .................... | G21C 3/3424 376/462 |
| 2011/0253341 | A1 | * | 10/2011 | Al-Otaibi ................. | F28D 7/16 165/69 |
| 2016/0273845 | A1 | * | 9/2016 | Rizzi ...................... | F28F 9/013 |

FOREIGN PATENT DOCUMENTS

| | | | | | |
|---|---|---|---|---|---|
| DE | 1085976 | B | * | 7/1960 | ............. G21C 3/34 |
| DE | 1085977 | B | * | 7/1960 | ............ G21C 3/352 |
| DE | 1514987 | A1 | * | 10/1969 | ............ G21C 3/352 |
| DE | 2840146 | A1 | * | 3/1980 | ............ F28F 9/0136 |
| DE | 3136865 | A1 | * | 3/1983 | ............ F28F 9/0131 |
| DE | 3630502 | A1 | * | 3/1988 | ............ F22B 37/205 |
| DE | 102013111290 | B3 | * | 8/2014 | ............. F28F 9/005 |
| EP | 105938 | A1 | * | 4/1984 | |
| EP | 2469215 | A1 | * | 6/2012 | |
| EP | 2887001 | A1 | * | 6/2015 | .............. F28F 9/013 |
| EP | 2975353 | A1 | * | 1/2016 | .............. F28F 9/001 |
| FR | 1257962 | A | * | 4/1961 | ............... G21C 3/34 |
| FR | 1469071 | A | * | 2/1967 | ............... G21C 3/32 |
| FR | 1539837 | A | * | 9/1968 | ............... F16L 3/22 |
| FR | 1544351 | A | * | 10/1968 | ............... G21C 3/32 |
| FR | 1576446 | A | * | 6/1969 | ............... F28D 7/06 |
| GB | 2079438 | A | * | 1/1982 | ............. F28F 9/0135 |
| JP | 57202497 | A | * | 12/1982 | ............... F28D 7/06 |
| JP | 58099692 | A | * | 6/1983 | ............ F28F 9/0136 |
| JP | 01019294 | A | * | 1/1989 | ............ F28F 9/0131 |
| JP | 03195893 | A | * | 8/1991 | |
| JP | 04240397 | A | * | 8/1992 | ............ F28F 9/0131 |
| RU | 2384807 | C1 | | 3/2010 | |
| WO | WO-2013049166 | A1 | * | 4/2013 | ............... F25B 39/02 |

* cited by examiner

HEAT EXCHANGER TUBE SPACING DEVICE (VARINATS)

CROSS-REFERENCE TO RELATED APPLICATIONS

This application is a US 371 Application from PCT/RU2015/000837 filed Dec. 1, 2015, which claims priority to Russia Application 2014153832 filed Dec. 30, 2014, the technical disclosures of which are hereby incorporated herein by reference.

FIELD OF THE INVENTION

This invention relates to heat exchange devices used in thermal systems of various fields, including nuclear power industry; more specifically, this device is intended to space tubes of heat exchangers mostly designed for operations in the heavy liquid metal coolant medium.

BACKGROUND OF THE INVENTION

Various heat exchanger tube spacing devices are currently in use. For example, it is specified in USSR Inventor's Certificate No. 1556253 (issued on Jan. 15, 1994), Russian Patent No. 2153643 (issued on Jul. 27, 2000) and Russian Utility Model Patent No. 6224 (issued on Mar. 16, 1998) that tubes of the heat exchanger bundle are bound by profiled plates (dividers) which are rather difficult to make.

Its closest analogue is a heat exchanger tube spacing device described in USSR Inventor's Certificate No. 515025 (issued on May 25, 1976). This device includes a supporting spacer grid which consists of two round-shaped coaxial cylindrical shells connected by an intermediate ring; each shell is provided with sleeves used to run the aforementioned heat exchange tubes through them; these sleeves are spaced apart at a preset gap and are bound with bridges, while sleeves of both shells are aligned in corners of equiangular triangles when observing along the shell axis. Russian Patents No. 2384807 (issued on Mar. 20, 2010) and No. 2386915 (issued on Apr. 20, 2010) describe similar solutions.

USSR Inventor's Certificate No. 400797 (issued on Oct. 1, 1973) by V. S. Neevin, S. G. Khachaturyan, L. A. Dolgy, N. A. Georgiyevsky, D. I. Isbatyrov is known where a spacer grid was made of a solid piece, while its cells were mostly formed by milling cut.

Reliability of fixation of heat exchanger tubes in such devices, especially under the effect of corrosion, vibration and high temperatures, is obviously insufficient due to the fact that sleeves of different shells are not interconnected, and the fixation of heat exchanger tubes in radial axis is not secure.

INVENTION DISCLOSURE

Therefore, there is an objective which includes the development of a heat exchanger tube spacing device in order to ensure more reliable fixation of tubes with their simultaneous spacing.

Implementation of this invention will lead to the following technical results:
increased fixation reliability with simultaneous spacing of heat exchanger tubes;
reliable fixation of heat exchanger tubes in radial axis;
possibility to move heat exchanger tubes axially;
independence of cells formed in the supporting spacer grid;
high vibration resistance;
high temperature resistance;

The above technical results are achieved by the following distinctive features of the invention.

To solve the aforementioned problem and to achieve the indicated technical result for the first object of this invention, a heat exchanger tube spacing device is proposed which includes at least one supporting spacer grid consisting of a cylindrical shell and at least two tiers of plates; these tiers are spaced apart at the preset gap; the width of each plate lies within the plane which is parallel to the shell axis; ends of all plates are fixed to the shell in such a way that plates of any tier are located at the preset gap being parallel to each other; plates of different tiers are criss-crossed at an angle of 60 degrees when observing along the shell axis, and are fastened together at the crossing points.

The feature of this invention by the first option lies in the fact that the sum of the preset gap between plates and the thickness of each plate may be equal to the spacing of heat exchanger tubes. Moreover, it is possible to choose a preset gap between plates which is less than the heat exchanger tube diameter by a corresponding drilling or reaming allowance of each cell formed by criss-crossed plates of both tiers when observing along the shell axis.

Another feature of the first option of this invention lies in fact that it is possible to use each supporting spacer grid independently, and the plates of both tiers have the same width.

Finally, another feature of the first option of this invention lies in fact that it is possible to use every two supporting spacer grids in combination, and the width of plates of the same tier of each supporting spacer grid is less than that of plates of the other tier which are turned clockwise against narrower plates when observing along the shell axis, while both supporting spacer grids are coupled in such a way as to align ends of narrower plates.

To solve the same objective and to achieve the same technical result for the second object of this invention, a heat exchanger tube spacing device is proposed which includes at least one supporting spacer grid consisting of a round-shaped cylindrical shell and two tiers of plates; these tiers are spaced apart at the preset gap and include three dividers running through the axis of the cylinder, while its ends are connected to the shell, and the distance between them makes an angle of 60 degrees; moreover, the width of each plate lies within the plane which is parallel to the shell axis, and ends of all plates of one section in each tier are connected either to the shell and one of the dividers, or to the adjacent dividers in such a way that plates of any section in each tier are spaced apart at a preset gap being parallel to each other, as well as to the divider with no planes connection; plates of both tiers are criss-crossed at an angle of 60 degrees when observing along the shell axis and are fastened together at crossing points.

The feature of this invention by the second option lies in the fact that the sum of the preset gap between plates and the thickness of each plate may be equal to the spacing of heat exchanger tubes. Moreover, it is possible to choose a preset gap between plates which is less than the heat exchanger tube diameter by a corresponding drilling or reaming allowance of each cell formed by criss-crossed plates of both tiers when observing along the shell axis.

Another feature of the first option of this invention lies in fact that it is possible to use each supporting spacer grid independently, and the plates of both tiers are of the same width.

Another feature of the second option of this invention lies in fact that every two supporting spacer grids are used in combination, and the width of plates of the same tier of each supporting spacer grid is less than that of plates of the other tier which are turned clockwise against narrower plates when observing along the shell axis, while both supporting spacer grids are coupled in such a way as to align ends of narrower plates in the corresponding sections.

Finally, another feature of the second option of this invention lies in fact that it is possible to design solid dividers in both tiers.

BRIEF DESCRIPTION OF THE DRAWINGS

The invention is illustrated in the attached drawings where identical or similar elements are assigned with the same reference signs.

EMBODIMENT OF THE INVENTION

The heat exchanger tube spacing device of the current invention is designed to ensure vibration resistance of steam-generating (evaporating) tubes which are made in a form of Field tubes well-known among experts (for instance, refer to Russian Patent No. 2534337 of Nov. 27, 2014). Since these tubes are intended to operate in the corrosive environment which is characterized by vibration, fretting and oxygen thermodynamic activity of heavy liquid metal coolant flowing around the tubes, it is very important to fix tubes properly.

This invention ensures highly reliable fixation of heat exchanger tubes owing to their positioning within cells formed in the supporting spacer grid which is described in details below.

Figure 1:
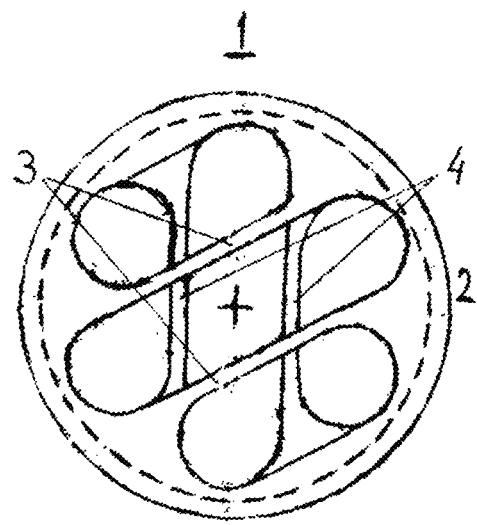
FIG. 1 depicts the first device option of this invention when observing along the shell axis.

The design of the heat exchanger tube spacing device of the first option of the present invention is presented in FIG. 1, as observed along the shell axis indicated with the cross. This device includes the supporting spacer grid indicated by a reference sign 1. Supporting spacer grid 1 consists of the cylindrical shell 2 (in FIG. 1 its inner surface is indicated with a dashed line) and two tiers of plates 3 and 4; plates 4 of the second tier are located behind plates 3 of the first tier. Plates 3 and 4 in each of these tiers are connected to the shell in such a way that they are spaced apart at a preset gap which is the same for both tiers; plates 3 of the first tier and plates 4 of the second tier are criss-crossed at an angle of 60 degrees when observing along the shell axis. The width of each plate 3 or 4 lies within the plane which is parallel to the shell axis; the thickness of each plate 3 or 4 is presented in FIG. 1. It should be noted that the sum of the preset gap between plates 3 or 4 and the thickness of each plate is equal to the spacing of the heat exchanger tubes (not indicated).

Within the frames of this invention the preset gap between plates 3 or 4 is less than the heat exchanger tube diameter by a corresponding drilling or reaming allowance of each cell formed by criss-crossed plates of both tiers when observing along the shell axis. In FIG. 1 a spacing device for seven tubes is depicted, where the central cell is rhomb-shaped, while other cells are rounded, changing from one side into a rhomb-shaped angle which is the same as that of the central cell. None of the cells of FIG. 1 are drilled or reamed.

Figure 2:
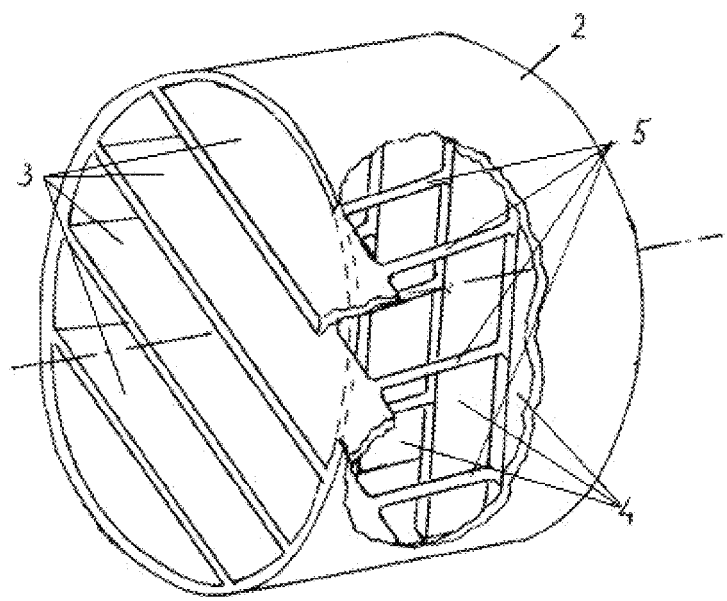
FIG. 2 depicts a provisional diagram of plates connections at different tiers of the device as per FIG. 1.

FIG. 2 depicts a provisional diagram of plate connections at different tiers of the device as per FIG. 1. To simplify the drawing all plates 3 and 4 are two-dimensional along their full length up to the wall of shell 2. Connections 5 between plates 3 and 4 of different tiers are intentionally elongated, though in fact they could be considerably shorter or completely absent, i. e., plates 3 could be connected with plates 4 at their crossing points. Thus, the preset gap between the first and the second tiers of plates 3 and 4 may assume any value, depending on technological considerations.

In FIG. 2 the width of plates 3 and 4 is approximately the same. In this design the device of the first option of the current invention can be used independently. However, there is another design of the supporting spacer grid 1 where plates 4 of the second tier are narrower than plates 3 of the first tier, for instance, by half. In this case, it is possible to combine two supporting spacer grids 1 in such a way as to put ends of narrower plates together. As in this case plates 3 of one tier of each supporting spacer grid 1 (wider plates) are turned, for instance, clockwise with regard to narrower plates when observing along the shell axis, the combination of two supporting spacer grids 1 will produce hexagonal tube cells.

Figure 3:
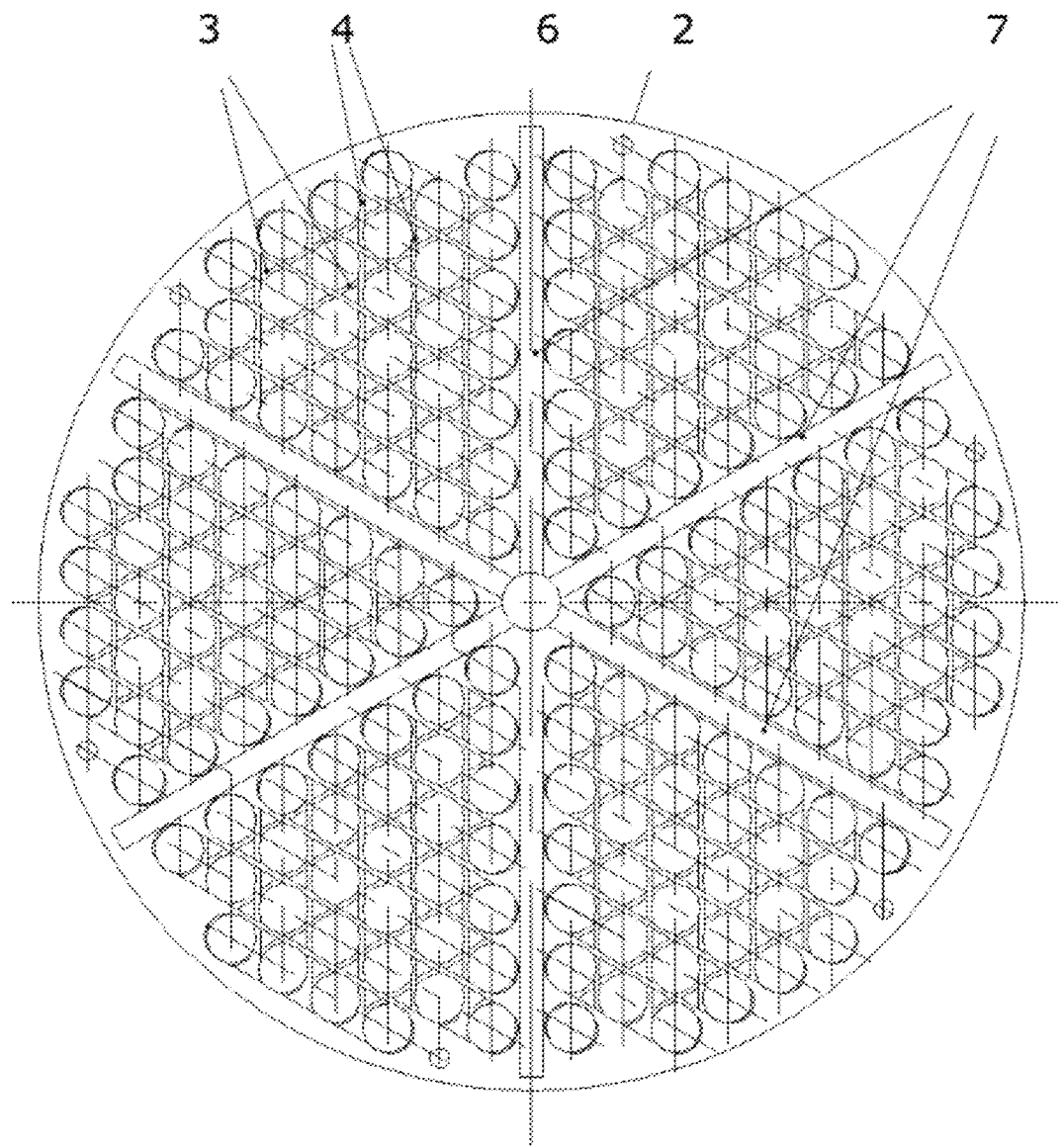
FIG. 3 depicts the second device option of this invention when observing along the shell axis, providing that two supporting spacer grids are used in combination.

In FIG. 3 the heat exchanger tube spacing device of the second option of the present invention is depicted. This device includes the supporting spacer grid indicated by a reference sign 6, which consists of a round-shaped cylindrical shell 2 and two tiers of plates 3 and 4 spaced apart at a preset gap (the same as the supporting spacer grid in FIG. 1). Just as for the device in FIG. 1, FIG. 3 depicts plates 3 and 4 of each tier which are spaced apart at a preset gap, being the same for both tiers; plates 3 of the first tier and plates 4 of the second tier are criss-crossed at an angle of 60 degrees when observing along the shell axis. The width of each plate 3 or 4 lies within the plane which is parallel to the shell axis, while the thickness of each plate 3 or 4 is shown in FIG. 3. Just as for the device in FIG. 1, the sum of the preset gap between plates 3 or 4 and the thickness of each plate is equal to the spacing of the heat exchanger tubes (not indicated).

The difference of the second option device of the current invention lies in the availability of three dividers 7 which run through the cylinder axis; their ends are connected to shell 2, being spaced from each other at an angle of 60 degrees. In each tier the ends of plates 3 or 4 of one section formed by two adjacent dividers 7 and an edge of shell 2 between them are connected either to shell 2 and one of the dividers 7 or to the adjacent dividers 7 in such a way that plates 3 or 4 of any section at each tier are spaced apart at a preset gap and are parallel to each other and to the divider 7 to which they are not connected. Plates of both tiers are criss-crossed at an angle of 60 when observing along the shell axis, and are fastened together at crossing points, similarly to the device in FIG. 1.

It should be noted that dividers 7 in both tiers can be solid, i. e., running through the entire length of the cylindrical shell 2, though, it is also possible to separate dividers 7 of one tier from dividers of another tier.

Just as in the first option of the invention, it is possible to use the second device option of the invention independently when plates 3 and 4 in both tiers are of the same width. However, there is another design of the supporting spacer grid 6 where plates 4 of the second tier are narrower than plates 3 of the first tier, for instance, by half. In this case, it is also possible to combine two supporting spacer grids 6 in such a way as to put together ends of narrower plates. Since plates 3 in one tier of each supporting spacer grid 6 (wider plates) are turned, for instance, clockwise with regard to narrower plates when observing along the shell axis, the combination of both supporting spacer grids 6 will produce hexagonal tube cells, resulting in better reliability of heat exchanger tube fixation.

Figure 4:
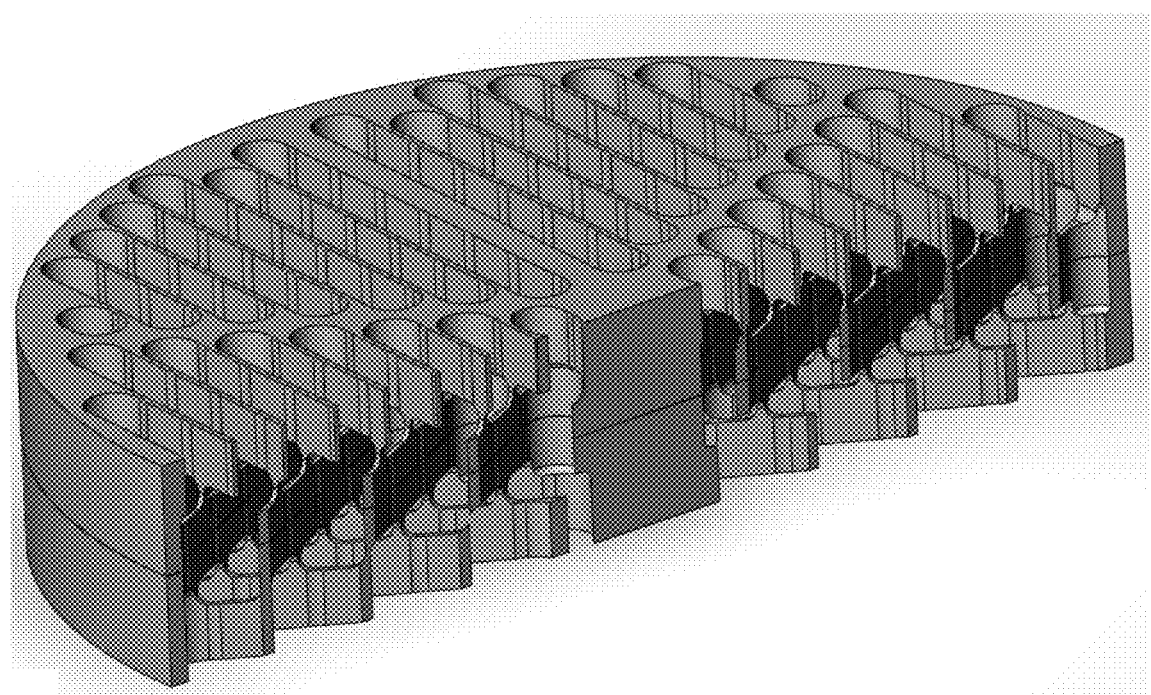
FIG. 4 depicts the general view of the device consisting of 3 plate tiers.

In FIG. 4 the heat exchanger tube spacing device with 3 plate tiers is depicted.

Thus, any device option of this invention will result in more reliable fixation of heat exchanger tubes with their simultaneous spacing in cells formed by plates in two or three tiers.

The invention claimed is:

1. Heat exchanger tube spacing device consisting of at least one supporting spacer grid consisting of a cylindrical shell and at least two tiers of plates spaced apart at a preset gap, while the width of each plate lies within the plane which is parallel to the shell axis; ends of all plates are fixed to the shell in such a way that plates of any tier are located at the preset gap being parallel to each other; plates of different tiers are criss-crossed at an angle of 60 degrees when observing along the shell axis, and are fastened together at the crossing points; wherein the sum of the preset gap between plates and the thickness of each plate is equal to the spacing of heat exchanger tubes.

2. The device according to claim 1, wherein the preset gap between plates is less than heat exchanger tube diameter by a corresponding drilling or reaming allowance of each cell formed by criss-crossed plates of both tiers when observing along the shell axis.

3. The device according to claim 1, wherein each supporting spacer grid is designed for independent use, and the width of plates in both tiers is the same.

4. The device according to claim 1, wherein two supporting spacer grids are designed to be used in combination, while the width of plates in one tier of each supporting spacer grid is less than that of plates of the other tier which are turned clockwise against narrower plates when observing along the shell axis, and both supporting spacer grids are coupled in such a way as to align ends of narrower plates in corresponding sections.

5. A heat exchanger tube spacing device consisting of at least one supporting spacer grid consisting of a round-shaped cylindrical shell and at least two tiers of plates spaced apart at a preset gap and include three dividers running through the cylinder axis; ends of these dividers are connected to the shell with the shift which makes an angle of 60 degrees; moreover, the width of each plate lies within the plane which is parallel to the shell axis; ends of plates of one section in each tier are connected either to the shell and one of the dividers, or to the adjacent dividers in such a way that plates of any section in each tier are spaced apart at a preset gap being parallel to each other and to the divider which they are not connected to; plates in both tiers are criss-crossed at an angle of 60 degrees when observing along the shell axis, and are fastened together at crossing points.

6. The device according to claim 5, wherein the sum of the preset gap between plates in any section and the thickness of each plate is equal to the spacing of heat exchanger tubes.

7. The device according to claim 6, wherein the preset gap between plates in any section is less than heat exchanger tube diameter by a corresponding drilling or reaming allowance of each cell formed by criss-crossed plates of both tiers when observing along the shell axis.

8. The device according to claim 5, wherein each supporting spacer grid is designed for independent use, and the width of plates in both tiers is the same.

9. The device according to claim 5, wherein two supporting spacer grids are designed to be used in combination, while the width of plates in one tier of each supporting spacer grid is less than that of plates of the other tier which are turned clockwise against narrower plates when observing along the shell axis, and both supporting spacer grids are coupled in such a way as to align ends of narrower plates in corresponding sections.

10. The device according to claim 5, wherein dividers in both tiers are integral.

* * * * *